(12) United States Patent
Nishimura et al.

(10) Patent No.: US 11,062,682 B2
(45) Date of Patent: Jul. 13, 2021

(54) VEHICLE, DISPLAY METHOD, AND PROGRAM

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Naoki Uenoyama, Nisshin (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/774,405

(22) Filed: Jan. 28, 2020

(65) Prior Publication Data

US 2020/0265807 A1    Aug. 20, 2020

(30) Foreign Application Priority Data

Feb. 20, 2019 (JP) .............................. JP2019-028497

(51) Int. Cl.
*G09G 5/373* (2006.01)
*B60Q 1/50* (2006.01)

(52) U.S. Cl.
CPC ............. *G09G 5/373* (2013.01); *B60Q 1/503* (2013.01); *G09G 2340/045* (2013.01); *G09G 2340/0492* (2013.01); *G09G 2380/10* (2013.01)

(58) Field of Classification Search
CPC .............. G09G 5/373; G09G 5/363; G09G 2340/0492; G09G 2360/18; G09G 2320/02; B60Q 1/503; B60Q 1/50; B60Q 1/506; G06T 11/001; G06T 15/04; G06T 15/005; G06F 9/44458; G06F 3/14
See application file for complete search history.

(56) References Cited

U.S. PATENT DOCUMENTS

| | | | | |
|---|---|---|---|---|
| 6,124,647 A | * | 9/2000 | Marcus | B60C 23/0401 307/10.1 |
| 9,704,216 B1 | * | 7/2017 | Laskar | G06F 3/012 |
| 10,576,893 B1 | * | 3/2020 | Salter | G03B 17/54 |
| 2013/0238441 A1 | * | 9/2013 | Panelli | G06Q 50/01 705/14.62 |
| 2017/0210293 A1 | * | 7/2017 | Sugama | G06F 3/048 |
| 2018/0338229 A1 | * | 11/2018 | Nemec | B60W 30/181 |
| 2020/0004341 A1 | * | 1/2020 | Li | G06F 3/017 |
| 2020/0125869 A1 | * | 4/2020 | Liao | G06K 9/00825 |

FOREIGN PATENT DOCUMENTS

JP        2014-232460 A    12/2014

* cited by examiner

*Primary Examiner* — Todd Buttram
(74) *Attorney, Agent, or Firm* — Oliff PLC

(57) ABSTRACT

A vehicle includes a display device that is visible from a front side, a measurement unit configured to measure a distance between the vehicle and a front vehicle which travels in the same direction as the vehicle, and a display control unit configured to horizontally invert display content on the display device based on the measured distance.

11 Claims, 4 Drawing Sheets

VEHICLE, DISPLAY METHOD, AND PROGRAM

INCORPORATION BY REFERENCE

The disclosure of Japanese Patent Application No. 2019-028497 filed on Feb. 20, 2019 including the specification, drawings and abstract is incorporated herein by reference in its entirety.

BACKGROUND

1. Technical Field

The disclosure relates to a vehicle, a display method, and a program.

2. Description of Related Art

Japanese Patent Application Publication No. 2014-232460 (JP 2014-232460 A) discloses a vehicle that displays an advertisement on the front side thereof.

SUMMARY

However, when an advertisement is displayed on the front side of a vehicle and a distance between the vehicle and a front vehicle is short, the advertisement may be covered by the front vehicle and thus it may be difficult for an oncoming vehicle or a pedestrian to see the advertisement. As a result, opportunities for the advertisement to be recognized are reduced.

This problem is considered to occur in the same way when information other than an advertisement is displayed.

The disclosure is for increasing opportunities for information which is displayed on the front side of a vehicle to be recognized.

According to an aspect of the disclosure, there is provided a vehicle including: a display device that is visible from a front side; a measurement unit configured to measure a distance between the vehicle and a front vehicle which travels in the same direction as the vehicle; and a display control unit configured to horizontally invert display content on the display device based on the measured distance.

Accordingly, information which is displayed on the front side of the vehicle can be seen in its original direction in a rearview mirror of a front vehicle.

As a result, it is possible to increase opportunities for information which is displayed on the front side of the vehicle to be recognized.

The vehicle according to the aspect of the disclosure may further include a determination unit configured to determine whether there is a person facing the vehicle. The display control unit may be configured to invert the display content regardless of the distance when there is a front vehicle and there is no person facing the vehicle.

Accordingly, information which is displayed on the front side of the vehicle can be seen in its original direction in a rearview mirror of a front vehicle.

As a result, it is possible to increase opportunities for information which is displayed on the front side of the vehicle to be recognized.

In the vehicle according to the aspect, the display control unit may be configured to additionally change a size of the display content based on the distance.

Accordingly, it is possible to change the size of a display content which is visible in a rearview mirror of a front vehicle based on a distance from the front vehicle.

As a result, it is possible to increase opportunities for information which is displayed on the front side of the vehicle to be recognized.

In the vehicle according to the aspect of the disclosure, the display content may include text.

Accordingly, text which is displayed on the front side of the vehicle can be seen in its original direction in a rearview mirror of a front vehicle.

As a result, it is possible to increase opportunities for text displayed on the front side of the vehicle to be recognized.

According to another aspect of the disclosure, there is provided a display method of causing a vehicle including a display device that is visible from a front side to perform: a measuring process of measuring a distance between the vehicle and a front vehicle which travels in the same direction as the vehicle; and a display process of horizontally inverting display content on the display device based on the measured distance.

Accordingly, information which is displayed on the front side of the vehicle can be seen in its original direction in a rearview mirror of a front vehicle.

As a result, it is possible to increase opportunities for information which is displayed on the front side of the vehicle to be recognized.

According to still another aspect of the disclosure, there is provided a program causing a vehicle including a display device that is visible from a front side to perform: a measuring process of measuring a distance between the vehicle and a front vehicle which travels in the same direction as the vehicle; and a display process of horizontally inverting display content on the display device based on the measured distance.

Accordingly, information which is displayed on the front side of the vehicle can be seen in its original direction in a rearview mirror of a front vehicle.

As a result, it is possible to increase opportunities for information which is displayed on the front side of the vehicle to be recognized.

It is possible to increase opportunities for information which is displayed on the front side of a vehicle to be recognized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
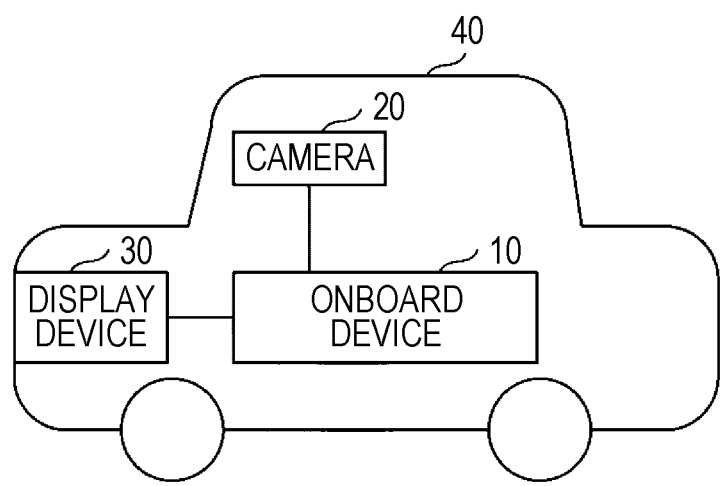
FIG. 1 is a diagram illustrating an example of a configuration of a vehicle 40 according to an embodiment of the disclosure.

Hereinafter, an embodiment of the disclosure will be described with reference to the accompanying drawings. FIG. 1 is a diagram illustrating an example of a configuration of a vehicle 40 according to an embodiment of the disclosure. In FIG. 1, the vehicle 40 includes an onboard device 10, a camera 20, and a display device 30.

The camera 20 is installed in the vehicle 40 to capture an image of an area in front of the vehicle 40, and captures an image of an area in front of the vehicle 40. The camera 20 may be, for example, a drive recorder or a camera which is installed to support driving.

The display device 30 is a device that displays display data (for example, image data). For example, a liquid crystal panel may be used as the display device 30. The display device 30 is installed in the vehicle 40 such that it is visible from the front of the vehicle 40. In this embodiment, content of display data (display content) is an advertisement including a character string.

The onboard device 10 is an information processing device to which an image captured by the camera 20 is input, which recognizes circumstances (a distance from a front vehicle) in front of the vehicle 40 based on the image, and changes a display mode of display data in the display device 30 based on a result of recognition.

Figure 2:
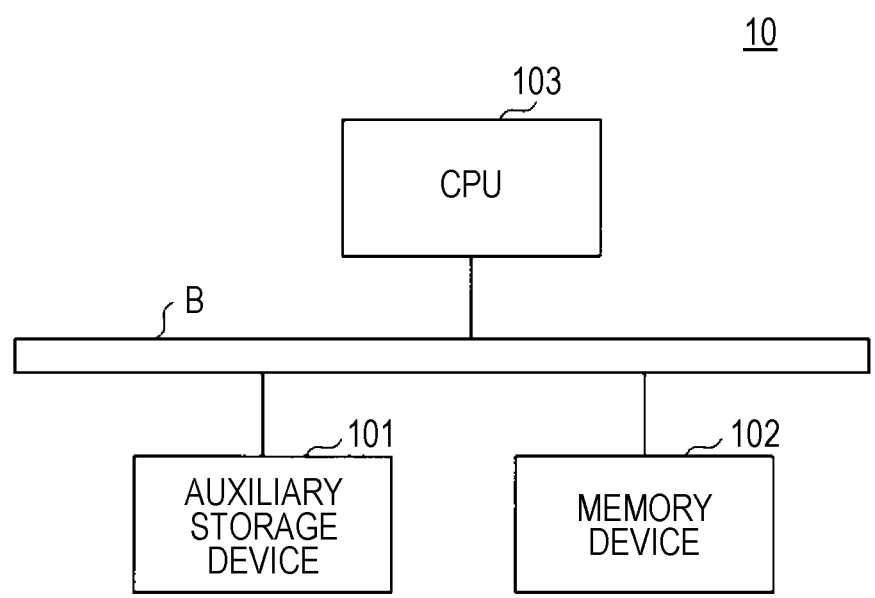
FIG. 2 is a diagram illustrating an example of a hardware configuration of an onboard device 10 according to the embodiment of the disclosure.

FIG. 2 is a diagram illustrating an example of a hardware configuration of the onboard device 10 according to the embodiment of the disclosure. The onboard device 10 illustrated in FIG. 2 includes an auxiliary storage device 101, a memory device 102, and a central processing unit (CPU) 103 which are connected to each other via a bus B.

A program for realizing processes in the onboard device 10 is installed in the auxiliary storage device 101. The auxiliary storage device 101 stores the installed program and stores necessary files, data, or the like.

When an instruction to start a program is given, the memory device 102 reads a program from the auxiliary storage device 101 and stores the read program. The CPU 103 performs functions associated with the onboard device 10 in accordance with a program stored in the memory device 102.

Figure 3:
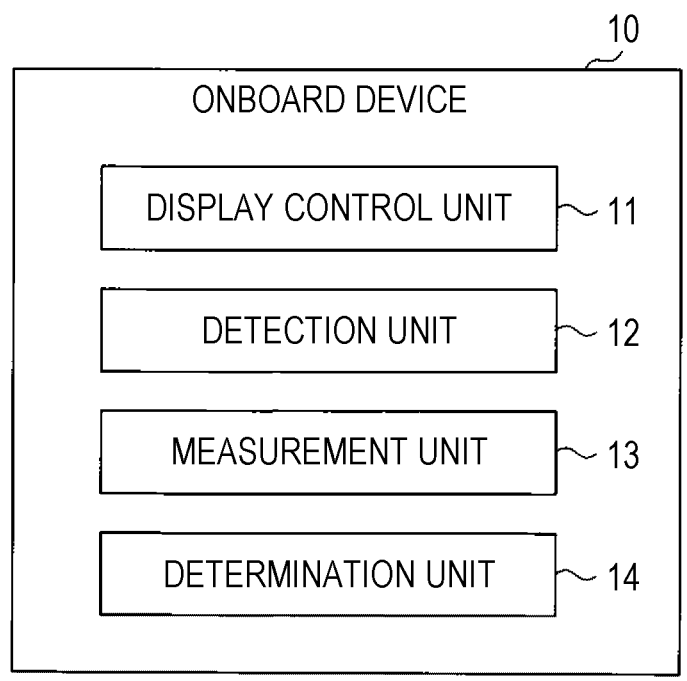
FIG. 3 is a diagram illustrating an example of a functional configuration of the onboard device 10 according to the embodiment of the disclosure.

FIG. 3 is a diagram illustrating an example of a functional configuration of the onboard device 10 according to the embodiment of the disclosure. In FIG. 3, the onboard device 10 includes a display control unit 11, a detection unit 12, a measurement unit 13, and a determination unit 14. These units are realized by causing the CPU 103 to execute one or more programs installed in the onboard device 10.

The display control unit 11 controls display of an advertisement on the display device 30. The detection unit 12 detects the presence of a front vehicle traveling in the same direction as the vehicle 40. The measurement unit 13 measures a distance from the front vehicle which is detected by the detection unit 12. The determination unit 14 determines whether an advertisement is to be horizontally inverted based on the distance.

Figure 4:
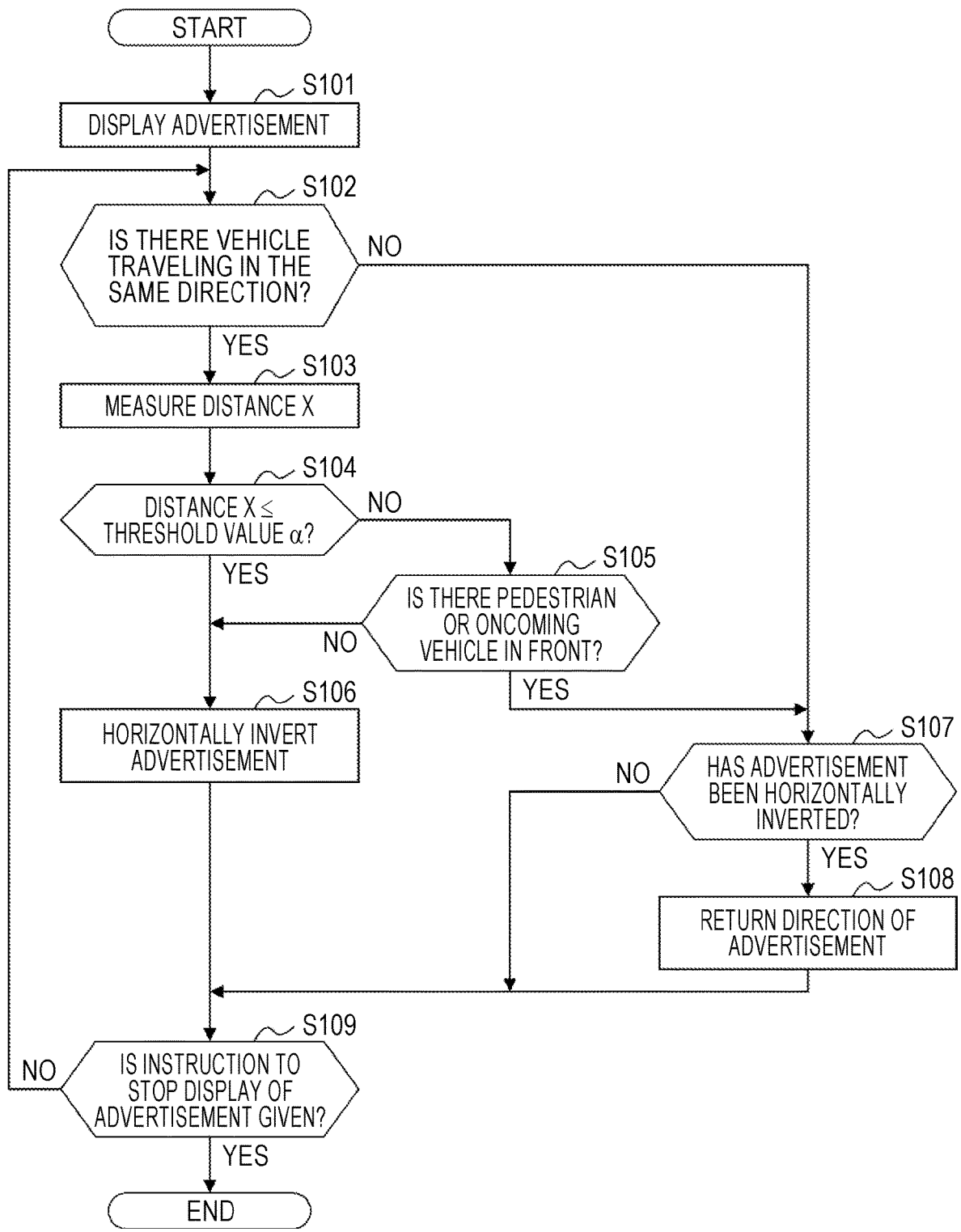
FIG. 4 is a flowchart illustrating an example of a process routine which is performed by the onboard device 10.

A process routine which is performed by the onboard device 10 will be described below. FIG. 4 is a flowchart illustrating an example of a process routine which is performed by the onboard device 10. The process routine illustrated in FIG. 4 is started, for example, in response to an input of an instruction to display an advertisement to the onboard device 10. The display instruction may be input by an occupant of the vehicle 40 or may be automatically input in response to ignition ON or the like.

In Step S101, the display control unit 11 displays an advertisement on the display device 30.

Figure 5:
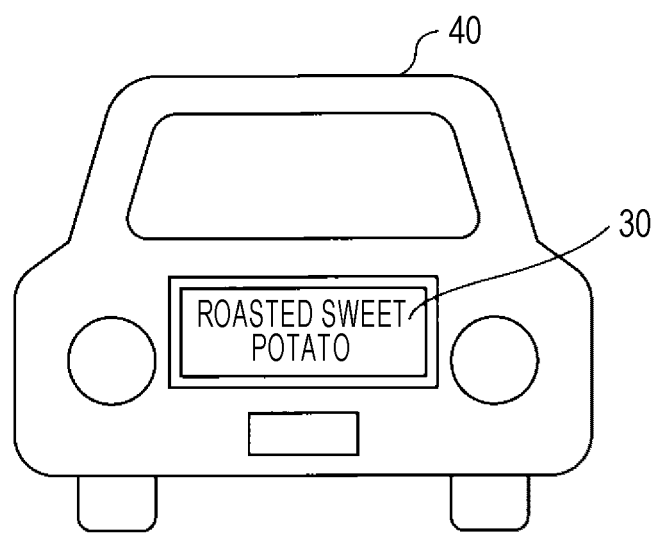
FIG. 5 is a diagram illustrating a display example of an advertisement.

FIG. 5 is a diagram illustrating a display example of an advertisement. In FIG. 5, the character string "roasted sweet potato" is displayed as an advertisement on the display device 30.

Subsequently, the detection unit 12 monitors whether there is another vehicle traveling in the same direction as the vehicle 40 in front of the vehicle 40 in real time, for example, by analyzing an image which is captured by the camera 20 (S102). A vehicle traveling in the same direction as the vehicle 40 is not limited to a front vehicle which travels in the same lane as the vehicle 40. For example, when the vehicle 40 is traveling on a road including a plurality of lanes such as an expressway or a national road, a front vehicle which is traveling in another lane qualifies as a vehicle traveling in the same direction as the vehicle 40.

When the detection unit 12 detects that there are one or more front vehicles traveling in the same direction as the vehicle 40 (YES in S102), the measurement unit 13 measures a distance X from a front vehicle which is closest to the vehicle 40 (that is, a front vehicle which travels immediately in front of the vehicle 40 and which is hereinafter referred to as a "front vehicle A") out of the one or more front vehicles (S103). Measurement of the distance X may be performed, for example, by analyzing an image which is captured by the camera 20. Alternatively, the distance X may be measured by a known method using a sensor other than the camera 20. For example, the distance X may be an inter-vehicle distance or may be a distance between a specific position of the vehicle 40 and a specific position of the front vehicle A.

Subsequently, the determination unit 14 determines whether the distance X is equal to or less than a threshold value α (S104). The threshold value α may be, for example, an upper limit of a distance at which, when there is an oncoming vehicle, a pedestrian, or the like in front of the vehicle 40, the oncoming vehicle, the pedestrian facing the vehicle 40, or the like cannot see the display device 30 of the vehicle 40 due to the presence of the front vehicle A. The pedestrian facing the vehicle 40 or the like includes a person who can see the display device 30 of the vehicle 40 such as a person who rides on a bicycle or a motorbike. "Facing the vehicle 40" refers to facing a direction in which the display device 30 of the vehicle 40 is visible.

When the distance X is equal to or less than the threshold value α (YES in S104), the display control unit 11 horizontally inverts an advertisement which is displayed on the display device 30 (S106).

Figure 6:
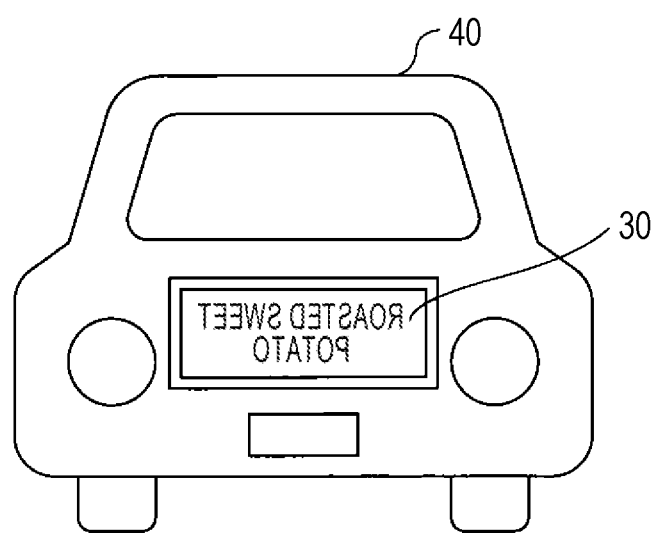
FIG. 6 is a diagram illustrating a display example of an advertisement which is horizontally inverted.

FIG. 6 is a diagram illustrating a display example of an advertisement which has been horizontally inverted. In FIG. 6, the character string "roasted sweet potato" illustrated in FIG. 5 is horizontally inverted and displayed. In this case, "roasted sweet potato" is visible in the state illustrated in FIG. 5 in a rearview mirror of the front vehicle A. As a result, when an occupant of the front vehicle A looks at the advertisement in the rearview mirror, she or he can see the character string "roasted sweet potato" in a state in which it is not horizontally inverted, and thus can easily see the advertisement. The display control unit 11 may additionally change the size of a character string of an advertisement based on the distance X in order to improve visibility of the advertisement in the rearview mirror of the front vehicle A. Specifically, as the distance x increases, the character string may be increased in size.

On the other hand, when the distance X is greater than the threshold value α (NO in S104), the determination unit 14 determines whether there is an oncoming vehicle or a pedestrian facing the vehicle 40 or the like in front of the vehicle 40 (S105). This determination may be performed by analyzing an image which is captured by the camera 20 or may be performed by another known method.

When there is no oncoming vehicle or pedestrian facing the vehicle 40 or the like in front of the vehicle 40 (NO in S105), the display control unit 11 horizontally inverts the advertisement displayed on the display device 30 as illustrated in FIG. 6 (S106). That is, when there is the front vehicle A and there is no pedestrian facing the vehicle 40, the advertisement may be horizontally inverted regardless of the distance X.

On the other hand, when there is an oncoming vehicle or a pedestrian facing the vehicle 40 or the like in front of the vehicle 40 (YES in S105) and when the advertisement is horizontally inverted and displayed at the present time (YES in S107), the display control unit 11 returns the direction of the advertisement to the original direction (that is, horizontal inversion of the advertisement is released) (S108). As a result, the advertisement is displayed as illustrated in FIG. 5.

In this way, when there is a front vehicle A and there is an oncoming vehicle or a pedestrian or the like who can see the advertisement, the advertisement may be displayed in the original direction. Accordingly, it is possible to display an advertisement such that the oncoming vehicle or the pedestrian or the like can easily understand the advertisement.

When the determination results of Steps S106 and S107 are negative, or subsequently to S108, the onboard device 10 repeatedly performs Step S102 and steps subsequent thereto until an instruction to stop display of an advertisement is input (S109). The instruction to stop display of an advertisement may be input, for example, by allowing an occupant of the vehicle 40 to perform a predetermined operation on the onboard device 10 or may be automatically input by ignition OFF or the like.

An example in which an advertisement is constituted by a character string has been described above, but the embodiment may be applied to an advertisement which is constituted by a figure or an image other than a character string.

An example in which information which is displayed on the display device 30 (display content) is an advertisement has been described above, but the embodiment may be applied to a case in which information other than an advertisement is displayed as display content.

As described above, according to the embodiment, when a distance from a front vehicle is equal to or less than a threshold value, information which is displayed on the front side of the vehicle 40 is horizontally inverted. Accordingly, the advertisement can be seen in the original direction in a rearview mirror of a front vehicle. As a result, it is possible to increase opportunities for the information to be recognized.

While an embodiment of the disclosure has been described above in detail, the disclosure is not limited to such a specific embodiment and can be modified or changed in various forms without departing from the gist of the disclosure described in the appended claims.

What is claimed is:

1. A vehicle comprising:
   a display device that is provided at a front side of the vehicle and is visible from the front side of the vehicle by non-occupants of the vehicle located in front of the vehicle;
   a measurement unit configured to measure a distance between the vehicle and a front vehicle which travels in front of the vehicle and in a same direction as the vehicle; and
   a display control unit configured to control the display device to selectively display content in an upright orientation and in a horizontally inverted orientation based on the distance measured by the measurement unit, the display control unit being configured to:
      cause the display device to display the content in the upright orientation when the front vehicle is not detected, and
      cause the display device to display the content in the horizontally inverted orientation when the front vehicle is detected and the distance measured by the measurement unit is less than or equal to a predetermined threshold.

2. The vehicle according to claim 1, further comprising a determination unit configured to determine whether there is a person facing the front of the vehicle,
   wherein the display control unit is configured to display the content in the horizontally inverted orientation regardless of whether the distance measured by the measurement unit is greater than, equal to or less than the predetermined threshold when the front vehicle is detected and the determination unit determines that there is no person facing the front of the vehicle.

3. The vehicle according to claim 1, wherein the display control unit is configured to additionally change a size of the content that is displayed based on the distance measured by the measurement unit.

4. The vehicle according to claim 1, wherein the content that is displayed includes text.

5. The vehicle according to claim 1, further comprising a determination unit configured to determine whether there is a person facing the front of the vehicle,
   wherein the display control unit is configured to cause the display device to display the content in the upright orientation when the front vehicle is detected, the distance measured by the measurement unit is greater than the predetermined threshold, and the determination unit determines that there is the person facing the front of the vehicle.

6. A display method of causing a vehicle including a display device that is provided at a front side of the vehicle and is visible from the front side of the vehicle by non-occupants of the vehicle located in front of the vehicle to perform:
   a measuring process of measuring a distance between the vehicle and a front vehicle which travels in front of the vehicle and in a same direction as the vehicle; and
   a display process of controlling the display device to selectively display content in an upright orientation and in a horizontally inverted orientation based on the distance measured by the measuring process, the display process:
      causing the display device to display the content in the upright orientation when the front vehicle is not detected, and
      causing the display device to display the content in the horizontally inverted orientation when the front vehicle is detected and the distance measured by the measuring process is less than or equal to a predetermined threshold.

7. The display method according to claim 6, wherein the vehicle further performs:

a determining process of determining whether there is a person facing the front of the vehicle,
wherein the display process displays the content in the horizontally inverted orientation regardless of whether the distance measured by the measuring process is greater than, equal to or less than the predetermined threshold when the front vehicle is detected and the determining process determines that there is no person facing the front of the vehicle.

8. The display method according to claim 6, wherein the vehicle further performs:
a determining process of determining whether there is a person facing the front of the vehicle,
wherein the display process causes the display device to display the content in the upright orientation when the front vehicle is detected, the distance measured by the measuring process is greater than the predetermined threshold, and the determining process determines that there is the person facing the front of the vehicle.

9. A non-transitory computer-readable recording medium on which is recorded a program that, when executed by a computer, causes a vehicle including a display device that is provided at a front side of the vehicle and is visible from the front side of the vehicle by non-occupants of the vehicle located in front of the vehicle to perform:
a measuring process of measuring a distance between the vehicle and a front vehicle which travels in front of the vehicle and in a same direction as the vehicle; and
a display process of controlling the display device to selectively display content in an upright orientation and in a horizontally inverted orientation based on the distance measured by the measuring process, the display process:
causing the display device to display the content in the upright orientation when the front vehicle is not detected, and
causing the display device to display the content in the horizontally inverted orientation when the front vehicle is detected and the distance measured by the measuring process is less than or equal to a predetermined threshold.

10. The non-transitory computer-readable recording medium according to claim 9, wherein the program further causes the vehicle to perform:
a determining process of determining whether there is a person facing the front of the vehicle,
wherein the display process displays the content in the horizontally inverted orientation regardless of whether the distance measured by the measuring process is greater than, equal to or less than the predetermined threshold when the front vehicle is detected and the determining process determines that there is no person facing the front of the vehicle.

11. The non-transitory computer-readable recording medium according to claim 9, wherein the program further causes the vehicle to perform:
a determining process of determining whether there is a person facing the front of the vehicle,
wherein the display process causes the display device to display the content in the upright orientation when the front vehicle is detected, the distance measured by the measuring process is greater than the predetermined threshold, and the determining process determines that there is the person facing the front of the vehicle.

* * * * *